United States Patent
Katayama et al.

(10) Patent No.: US 9,216,638 B2
(45) Date of Patent: Dec. 22, 2015

(54) STRUCTURE FOR MOUNTING BATTERY PACK ON VEHICLE

(71) Applicant: HONDA MOTOR CO., LTD., Tokyo (JP)

(72) Inventors: Goichi Katayama, Wako (JP); Koichi Yamamoto, Wako (JP); Yasuaki Hotozuka, Wako (JP); Ryo Fujii, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/362,471

(22) PCT Filed: Dec. 5, 2012

(86) PCT No.: PCT/JP2012/081506
§ 371 (c)(1),
(2) Date: Jun. 3, 2014

(87) PCT Pub. No.: WO2013/084936
PCT Pub. Date: Jun. 13, 2013

(65) Prior Publication Data
US 2014/0374180 A1    Dec. 25, 2014

(30) Foreign Application Priority Data

Dec. 9, 2011 (JP) .................................. 2011-269843

(51) Int. Cl.
*B60K 1/04* (2006.01)
*B60L 7/12* (2006.01)
(Continued)

(52) U.S. Cl.
CPC . *B60K 1/04* (2013.01); *B60L 1/003* (2013.01); *B60L 7/12* (2013.01); *B60L 11/1805* (2013.01);
(Continued)

(58) Field of Classification Search
CPC .......... Y02T 10/7005; H01M 10/5016; H01M 2/1083; B60K 2001/0438; B60K 1/04

USPC .......................................................... 180/68.5
See application file for complete search history.

(56) References Cited

U.S. PATENT DOCUMENTS 4,365,681 A * 12/1982 Singh ........................... 180/68.5
5,378,555 A *  1/1995 Waters et al. ................... 429/97
(Continued)

FOREIGN PATENT DOCUMENTS

JP    9-163817 A    6/1997
JP    2000-92616 A    3/2000
(Continued)

OTHER PUBLICATIONS

Written Opinion dated Jan. 14, 2014, issued in corresponding Japanese Application No. PCT/JP2012/081506. (6 pages).
(Continued)

*Primary Examiner* — Brodie Follman
(74) *Attorney, Agent, or Firm* — Westerman, Hattori, Daniels & Adrian, LLP

(57) ABSTRACT

In a structure for mounting a battery pack on a vehicle, even if a battery case housing a plurality of batteries is disposed beneath a floor panel, due to an internal cable within the battery case being disposed above the batteries, it is possible to prevent the internal cable from becoming wet. Furthermore, if the internal cable disposed above the batteries were connected to an external cable via a high voltage connector without changing the height, the height of the floor panel would increase to thus constrain the vehicle compartment space, but since the high voltage connector is disposed at a position that is lower than the upper end of the battery, it is possible to decrease the height of the floor panel by disposing the external cable at a low position, thereby ensuring the vehicle compartment space.

22 Claims, 4 Drawing Sheets

(51) Int. Cl.
- *B60L 11/18* (2006.01)
- *B60R 16/04* (2006.01)
- *B60L 1/00* (2006.01)
- *B60K 11/06* (2006.01)
- *B60K 1/00* (2006.01)

(52) U.S. Cl.
CPC ......... *B60L 11/1864* (2013.01); *B60L 11/1874* (2013.01); *B60L 11/1877* (2013.01); *B60L 11/1879* (2013.01); *B60R 16/04* (2013.01); *B60K 11/06* (2013.01); *B60K 2001/001* (2013.01); *B60K 2001/005* (2013.01); *B60K 2001/0438* (2013.01); *B60Y 2400/61* (2013.01); *Y02T 10/7005* (2013.01); *Y02T 10/7061* (2013.01)

(56) References Cited

U.S. PATENT DOCUMENTS

| | | | | |
|---|---|---|---|---|
| 5,501,289 | A * | 3/1996 | Nishikawa et al. | 180/68.5 |
| 5,534,364 | A * | 7/1996 | Watanabe et al. | 429/61 |
| 5,948,298 | A * | 9/1999 | Ijaz | 219/209 |
| 6,094,927 | A * | 8/2000 | Anazawa et al. | 62/239 |
| 6,188,574 | B1 * | 2/2001 | Anazawa | 361/695 |
| 6,220,380 | B1 * | 4/2001 | Mita et al. | 180/65.1 |
| 6,460,642 | B1 * | 10/2002 | Hirano | 180/65.1 |
| 6,541,154 | B2 * | 4/2003 | Oogami et al. | 429/159 |
| 6,598,691 | B2 * | 7/2003 | Mita et al. | 180/68.5 |
| 6,938,553 | B2 * | 9/2005 | Tamaki et al. | 104/34 |
| 7,025,160 | B2 * | 4/2006 | Awakawa | 180/68.5 |
| 7,048,321 | B2 * | 5/2006 | Bandoh et al. | 296/37.8 |
| 7,172,042 | B2 * | 2/2007 | Yamaguchi et al. | 180/65.1 |
| 7,401,669 | B2 * | 7/2008 | Fujii et al. | 180/65.1 |
| 7,427,093 | B2 * | 9/2008 | Watanabe et al. | 296/37.15 |
| 7,469,759 | B2 * | 12/2008 | Botzelmann | 180/65.28 |
| 7,497,284 | B2 * | 3/2009 | Yamaguchi et al. | 180/65.1 |
| 7,561,445 | B2 * | 7/2009 | Yajima et al. | 361/826 |
| 7,749,644 | B2 * | 7/2010 | Nishino | 429/100 |
| 7,926,602 | B2 * | 4/2011 | Takasaki | 180/68.5 |
| 7,931,105 | B2 * | 4/2011 | Sato et al. | 180/68.5 |
| 8,012,620 | B2 * | 9/2011 | Takasaki et al. | 429/100 |
| 8,205,700 | B2 * | 6/2012 | Nagata et al. | 180/68.5 |
| 8,276,697 | B2 * | 10/2012 | Takasaki | 180/68.5 |
| 8,403,090 | B2 * | 3/2013 | Fujiwara et al. | 180/68.5 |
| 8,444,216 | B2 * | 5/2013 | Yamaguchi et al. | 296/208 |
| 8,464,817 | B2 * | 6/2013 | Usami et al. | 180/68.5 |
| 8,561,296 | B2 * | 10/2013 | Oga et al. | 29/857 |
| 8,561,743 | B2 * | 10/2013 | Iwasa et al. | 180/68.5 |
| 8,624,114 | B2 * | 1/2014 | Oga et al. | 174/72 R |
| 8,733,487 | B2 * | 5/2014 | Usami et al. | 180/68.5 |
| 8,741,466 | B2 * | 6/2014 | Youngs et al. | 429/120 |
| 8,757,304 | B2 * | 6/2014 | Amano et al. | 180/65.1 |
| 8,881,853 | B2 * | 11/2014 | Nitawaki | 180/68.5 |
| 8,899,360 | B2 * | 12/2014 | Mochizuki | 180/65.1 |
| 8,911,892 | B2 * | 12/2014 | Lent et al. | 429/99 |
| 8,936,303 | B2 * | 1/2015 | Awakawa et al. | 296/208 |
| 8,960,350 | B2 * | 2/2015 | Kosaki et al. | 180/68.5 |
| 8,993,142 | B2 * | 3/2015 | Sakai et al. | 429/61 |
| 2002/0102457 | A1 * | 8/2002 | Oogami et al. | 429/159 |
| 2011/0068622 | A1 * | 3/2011 | Ikeno et al. | 307/10.1 |
| 2011/0297467 | A1 * | 12/2011 | Iwasa et al. | 180/65.31 |
| 2011/0297469 | A1 * | 12/2011 | Usami et al. | 180/68.5 |
| 2012/0018238 | A1 * | 1/2012 | Mizoguchi et al. | 180/68.5 |
| 2012/0055724 | A1 * | 3/2012 | Iwasa et al. | 180/68.5 |
| 2012/0055725 | A1 * | 3/2012 | Mizoguchi et al. | 180/68.5 |
| 2012/0097466 | A1 * | 4/2012 | Usami et al. | 180/68.5 |
| 2012/0115001 | A1 * | 5/2012 | Hatta et al. | 429/100 |
| 2012/0148889 | A1 * | 6/2012 | Fuhr et al. | 429/87 |
| 2012/0312610 | A1 * | 12/2012 | Kim et al. | 180/65.31 |
| 2012/0312614 | A1 * | 12/2012 | Fujiwara et al. | 180/68.5 |
| 2013/0134775 | A1 * | 5/2013 | Tomokage et al. | 307/9.1 |
| 2013/0161310 | A1 * | 6/2013 | Kinoshita et al. | 219/209 |
| 2013/0241493 | A1 * | 9/2013 | Kosaki et al. | 320/128 |
| 2013/0344370 | A1 * | 12/2013 | Kinoshita et al. | 429/120 |
| 2013/0344371 | A1 * | 12/2013 | Kinoshita et al. | 429/120 |
| 2014/0017546 | A1 * | 1/2014 | Yanagi | 429/120 |
| 2014/0060944 | A1 * | 3/2014 | Fillion et al. | 180/65.31 |
| 2014/0079977 | A1 * | 3/2014 | Tsujimura et al. | 429/120 |
| 2014/0322568 | A1 * | 10/2014 | Sakai et al. | 429/61 |
| 2014/0326524 | A1 * | 11/2014 | Ogushi et al. | 180/68.5 |
| 2014/0338999 | A1 * | 11/2014 | Fujii et al. | 180/68.5 |
| 2014/0374180 | A1 * | 12/2014 | Katayama et al. | 180/68.5 |

FOREIGN PATENT DOCUMENTS

| | | |
|---|---|---|
| JP | 2002-134084 A | 5/2002 |
| JP | 2008-230483 A | 10/2008 |
| JP | 2011-20553 A | 2/2011 |
| JP | 2011-23292 A | 2/2011 |

OTHER PUBLICATIONS

International Search Report dated Feb. 19, 2013 issued in corresponding application No. PCT/JP2012/081506.

* cited by examiner

STRUCTURE FOR MOUNTING BATTERY PACK ON VEHICLE

TECHNICAL FIELD

The present invention relates to a structure for mounting a battery pack on a vehicle in which a battery case housing a plurality of batteries is disposed beneath a floor panel, and power of the battery is supplied to a control device of an electric motor via an internal cable disposed within the battery case, a cable lead out part provided on the battery case, and an external cable disposed outside the battery case.

BACKGROUND ART

An arrangement in which an external cable led out forward from the front end of a battery case housing a plurality of battery modules is connected to a power control unit of an electric motor mounted on a vehicle body front part via the underneath of a floor panel is known from Patent Document 1 below.

RELATED ART DOCUMENTS

Patent Documents

Patent Document 1: Japanese Patent Application Laid-open No. 2011-23292

SUMMARY OF THE INVENTION

Problems to be Solved by the Invention

In the above arrangement, since the internal cable within the battery case is disposed at a position lower than an upper face of the battery module, there is the problem that if water enters the battery case, the internal cable easily becomes wet.

The present invention has been accomplished in light of the above circumstances, and it is an object thereof to protect an internal cable from becoming wet when water enters a battery case and prevent an external cable connected to a control device of an electric motor from constraining the capacity of a vehicle compartment.

Means for Solving the Problems

In order to attain the above object, according to a first aspect of the present invention, there is provided a structure for mounting a battery pack on a vehicle in which a battery case housing a plurality of batteries is disposed beneath a floor panel, and power of the battery is supplied to a control device of an electric motor via an internal cable disposed within the battery case, a cable lead out part provided on the battery case, and an external cable disposed outside the battery case, wherein the internal cable is disposed above the battery, and the cable lead out part is disposed at a position that is lower than upper ends of the batteries.

Further, according to a second aspect of the present invention, in addition to the first aspect, the cable lead out part is disposed beneath a footrest portion for an occupant on a front seat.

Furthermore, according to a third aspect of the present invention, in addition to the first or second aspect, the control device is disposed above the battery case and the external cable extends upwardly from the cable lead out part toward the control device.

Moreover, according to a fourth aspect of the present invention, in addition to any one of the first to third aspects, the batteries form a plurality of rows extending in a fore-and-aft direction in the interior of the battery case, and a front end of a row on a middle side in a vehicle width direction extends further forward than front ends of rows on opposite end sides in the vehicle width direction.

Further, according to a fifth aspect of the present invention, in addition to the fourth aspect, the cable lead out part is disposed, among the plurality of rows of the batteries, in front of a row on one end side in the vehicle width direction.

Furthermore, according to a sixth aspect of the present invention, in addition to the fifth aspect, the cable lead out part is disposed, among the plurality of rows of the batteries, to the rear of the front end of a row on the middle side in the vehicle width direction.

Moreover, according to a seventh aspect of the present invention, in addition to the fifth or sixth aspect, a low voltage connector for supplying a signal to control equipment of the battery is provided, among the plurality of rows of the batteries, in front of a row on the other end side in the vehicle width direction.

A motor/generator 23 of an embodiment corresponds to the electric motor of the present invention, a junction board 28 of the embodiment corresponds to the control equipment of the present invention, a battery module 42 of the embodiment corresponds to the battery of the present invention, and a high voltage connector 54 of the embodiment corresponds to the cable lead out part of the present invention.

Effects of the Invention

In accordance with the first aspect of the present invention, even if the battery case housing the plurality of batteries is disposed beneath the floor panel, due to the internal cable within the battery case being disposed above the batteries, it is possible to prevent the internal cable from becoming wet. Furthermore, if the internal cable disposed above the batteries were connected to the external cable via the cable lead out part without changing the height, the height of the floor panel above the lead out part of the cable or the external cable would increase to thus constrain the vehicle compartment space, but since the cable lead out part is disposed at a position that is lower than the upper ends of the batteries, it is possible to decrease the height of the floor panel by disposing the external cable at a low position, thereby ensuring the vehicle compartment space.

Moreover, in accordance with the second aspect of the present invention, even if the cable lead out part is disposed beneath the footrest part for an occupant of the front seat, due to the height of the cable lead out part being low it is possible to easily ensure the space for the footrest part for an occupant.

Furthermore, in accordance with the third aspect of the present invention, when the external cable is bent upwardly from the cable lead out part of the battery case toward the control device of the electric motor disposed above the battery case, if the cable lead out part were disposed at a position higher than the upper end of the battery, the bending curvature of the cable would increase and assembly would be difficult, but due to the cable lead out part being disposed at a position that is lower than the upper end of the battery, the bending curvature of the cable can be reduced, thus making assembly easy.

Moreover, in accordance with the fourth aspect of the present invention, the batteries form a plurality of rows extending in the fore-and-aft direction in the interior of the battery case, and since the front end of the row on the middle side in the vehicle width direction extends further forward than the front ends of the rows on opposite end sides in the vehicle width direction, it becomes possible to increase the storage capacity by a portion corresponding to the batteries positioned at the front end of the row on the middle side in the vehicle width direction. Furthermore, due to the batteries being positioned at the front end of the row on the middle side in the vehicle width direction by utilizing a space formed between the left and right seats, not only is it possible to avoid interference with the left and right seats, but it is also possible to ensure a space for a footrest part for an occupant seated on the seat by utilizing the space formed due to the front ends of the rows on opposite end sides in the vehicle width direction being further to the rear than the front end of the row on the middle side in the vehicle width direction.

Moreover, in accordance with the fifth aspect of the present invention since, among the plurality of rows of batteries, the cable lead out part is disposed in front of the row on one end side in the vehicle width direction, it is possible to suppress any increase in the length in the fore-and-aft direction of the battery pack compared with a case in which it is disposed in front of the row on the middle side in the vehicle width direction.

Furthermore, in accordance with the sixth aspect of the present invention since, among the plurality of rows of batteries, the cable lead out part is disposed to the rear of the front end of the row on the middle side in the vehicle width direction, it is possible to dispose the cable lead out part by utilizing effectively a space between the forward end of the row on the middle side in the vehicle width direction and the forward end of the row on one end side in the vehicle width direction.

Moreover, in accordance with the seventh aspect of the present invention since, among the plurality of rows of batteries, the low voltage connector for supplying a signal to the control equipment for the battery is provided in front of the row on the other end side in the vehicle width direction, it is possible to enhance the space efficiency by dividing the cable lead out part and the low voltage connector between opposite sides in the vehicle width direction.

EXPLANATION OF REFERENCE NUMERALS AND SYMBOLS

Figure 1:
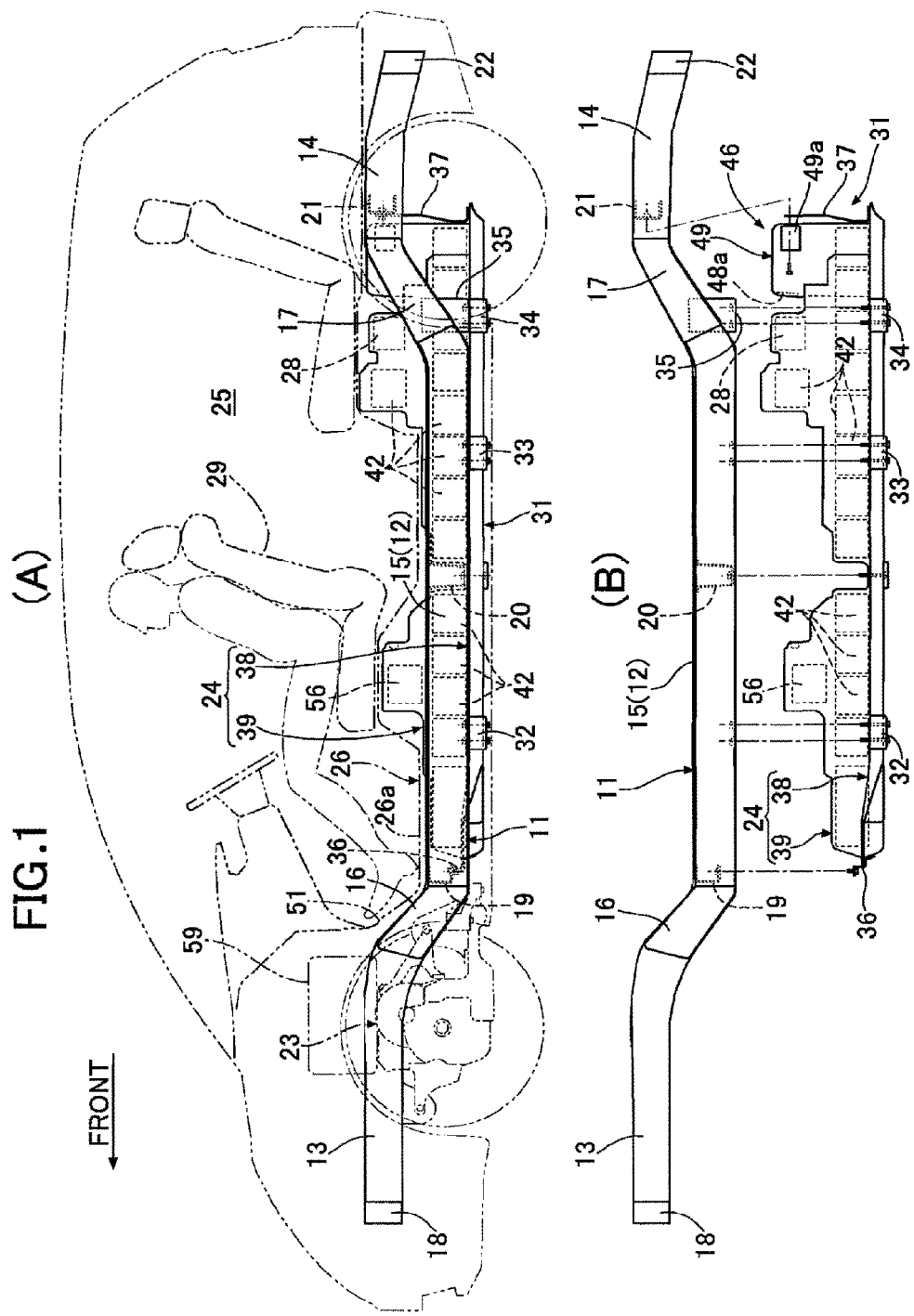
FIG. 1 is a side view of an electric automobile. (first embodiment)

23 Motor/generator (electric motor)
24 Battery case
26 Floor panel
26a Footrest portion
28 Junction board (control equipment)
29 Front seat
42 Battery module (battery)
54 High voltage connector (cable lead out part)
55 Internal cable
57 Internal cable
58 External cable
59 Power control unit (control device)
61 Low voltage connector

MODES FOR CARRYING OUT THE INVENTION

A mode for carrying out the present invention is explained below by reference to FIG. 1 to FIG. 4.

First Embodiment

Figure 2:
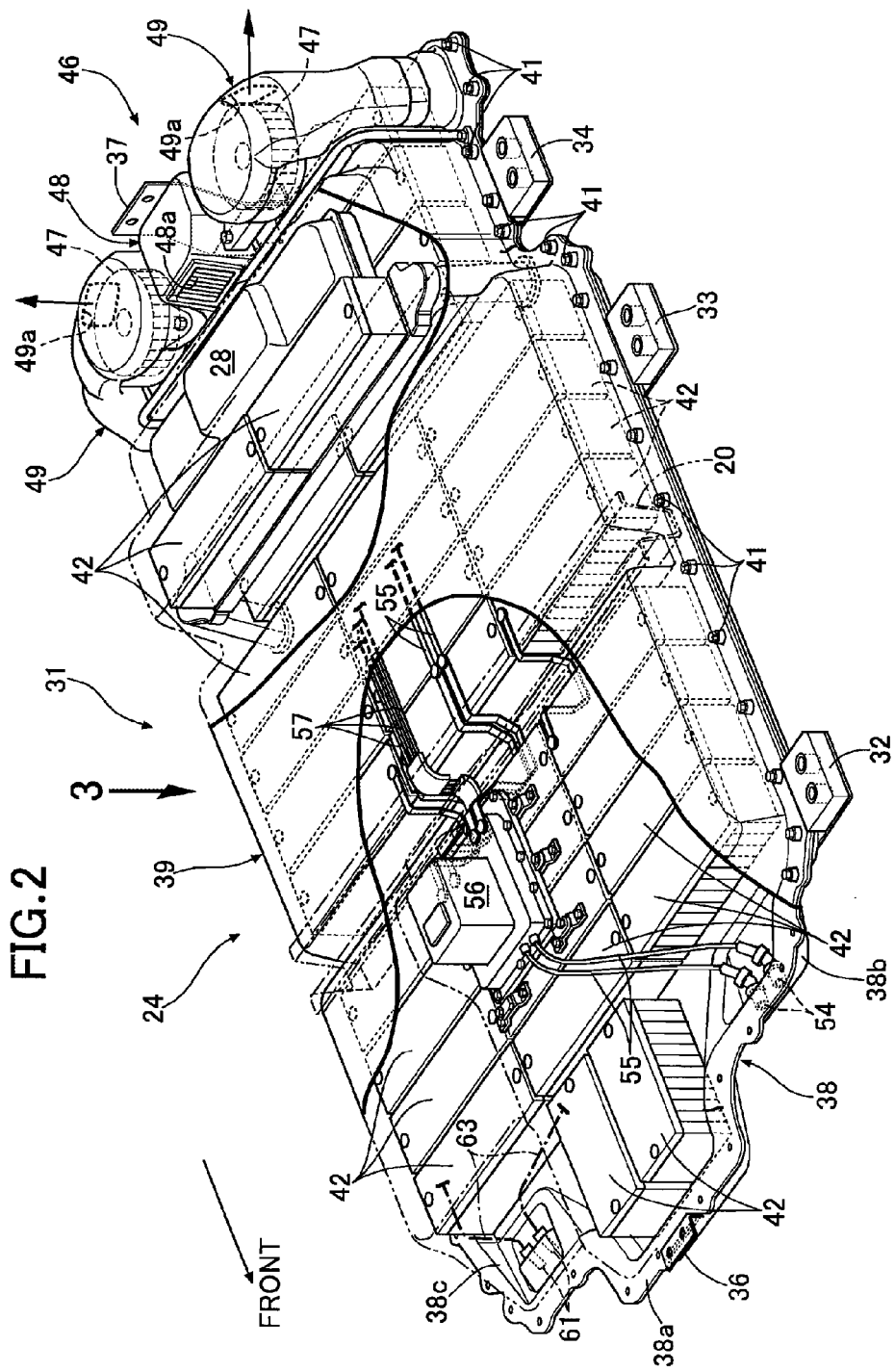
FIG. 2 is a perspective view of a battery pack. (first embodiment)
Figure 3:
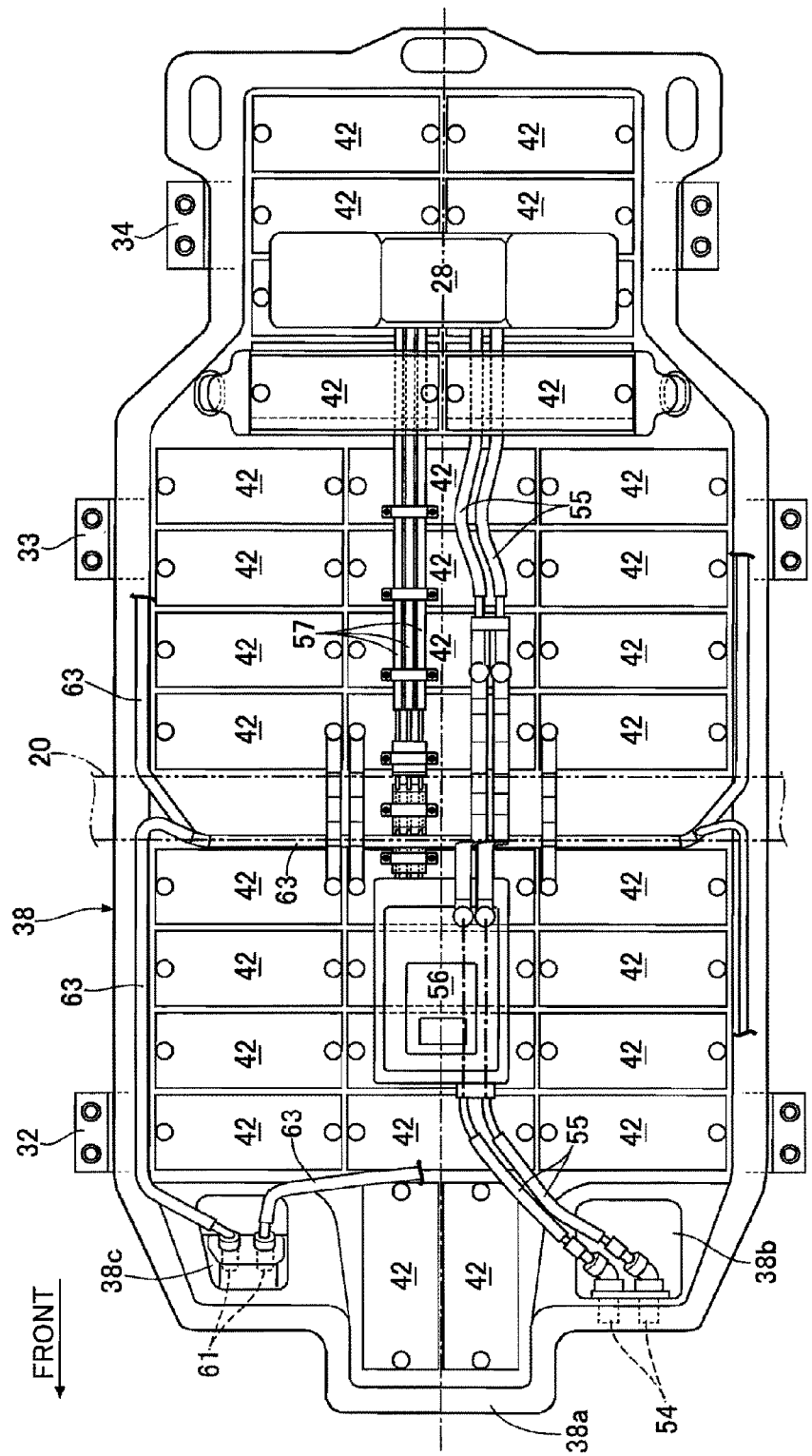
FIG. 3 is a view in the direction of arrow 3 in FIG. 2. (first embodiment)

As shown in FIG. 1 to FIG. 3, a vehicle body frame 11 of an electric automobile includes a pair of left and right floor frames 12 and 12 extending in the vehicle body fore-and-aft direction, a pair of left and right front side frames 13 and 13 extending forwardly from the front ends of the floor frames 12 and 12 while bending upwardly, a pair of left and right rear side frames 14 and 14 extending rearwardly from the rear ends of the floor frames 12 and 12 while bending upwardly, a pair of left and right side sills 15 and 15 disposed outside, in the vehicle width direction, of the floor frames 12 and 12, a pair of left and right front outriggers 16 and 16 connecting the front ends of the side sills 15 and 15 to the front ends of the floor frames 12 and 12, a pair of left and right rear outriggers 17 and 17 connecting the rear ends of the side sills 15 and 15 to the rear ends of the floor frames 12 and 12, a front bumper beam 18 providing a connection between front end parts of the pair of left and right front side frames 13 and 13 in the vehicle width direction, a front cross member 19 providing a connection between front end parts of the pair of left and right floor frames 12 and 12 in the vehicle width direction, a middle cross member 20 providing a connection between intermediate parts, in the fore-and-aft direction, of the pair of left and right floor frames 12 and 12 in the vehicle width direction, a rear cross member 21 providing a connection between intermediate parts, in the fore-and-aft direction, of the pair of left and right rear side frames 14 and 14 in the vehicle width direction, and a rear bumper beam 22 providing a connection between rear end parts of the pair of left and right rear side frames 14 and 14 in the vehicle width direction.

A battery pack 31, which is a power source for a motor/generator 23 that is a drive source for making the electric automobile travel, is supported so as to be suspended from a lower face of the vehicle body frame 11. That is, fixed to a lower face of the battery pack 31 are a front suspension beam 32, middle suspension beam 33, and rear suspension beam 34 extending in the vehicle width direction, fixed to front parts of the pair of left and right floor frames 12 and 12 are opposite ends of the front suspension beam 32, fixed to rear parts of the pair of left and right floor frames 12 and 12 are opposite ends of the middle suspension beam 33, and fixed to the lower ends of support members 35 and 35 hanging down from front parts of the pair of left and right rear side frames 14 and 14 are opposite ends of the rear suspension beam 34. Furthermore, a middle part, in the vehicle width direction, of the front end of the battery pack 31 is supported on the front cross member 19 via a front bracket 36, and a middle part, in the vehicle width direction, of the rear end of the battery pack 31 is supported on the rear cross member 21 via a rear bracket 37. Moreover, the battery pack 31 is supported on a lower face of the middle cross member 20 in an intermediate position between the front suspension beam 32 and the middle suspension beam 33.

In a state in which the battery pack 31 is supported on the vehicle body frame 11, an upper face of the battery pack 31 opposes a lower part of a vehicle compartment 25 via a floor panel 26. That is, the battery pack 31 of the present embodiment is disposed outside the vehicle compartment 25.

The battery pack 31 includes a battery tray 38 made of metal and a battery cover 39, made of a synthetic resin, superimposed on the battery tray 38 from above. A peripheral part of the battery tray 38 and a peripheral part of the battery cover 39 are secured by means of a large number of bolts 41 with a seal member 40 (not illustrated) sandwiched therebetween, the interior of the battery pack 31 being therefore basically hermetically sealed. A plurality of battery modules 42, in which a plurality of battery cells are stacked in series, are mounted on an upper face of the battery tray 38. The battery tray 38 and the battery cover 39 form a battery case 24 of the present invention.

A cooling device 46 provided on a rear part of the battery pack 31 includes a suction duct 48 disposed in a middle part in the vehicle width direction and a pair of left and right discharge ducts 49 and 49 disposed on opposite sides in the vehicle width direction of the suction duct 48. Cooling air sucked in via the suction duct 48 flows through the cooling passage disposed in the interior of the battery tray 38 and is discharged to the outside via the left and right discharge ducts 49 and 49.

A cooling air suction port 48a opens on a front face of an upper part of the suction duct 48 so as to face forward, the cooling air suction port 48a sucking air outside the battery pack 31 into the interior of the suction duct 48 as cooling air. Electric cooling fans 47 and 47 are housed in the interiors of the respective discharge ducts 49 and 49, and cooling air discharge ports 49a and 49a are formed so as to face the outer peripheries of the respective cooling fans 47 and 47, the cooling air discharge ports 49a and 49a discharging cooling air that has been subjected to heat exchange. The left and right cooling air discharge ports 49a and 49a open rearwardly and outwardly in the vehicle width direction.

Therefore, when the cooling fans 47 and 47 are driven, cooling air sucked in via the cooling air suction port 48a of the suction duct 48 is supplied to the interior of the battery tray 38, carries out heat exchange with the battery modules 42 while flowing through the cooling passage in the interior of the battery tray 38, then passes through the cooling fans 47 and 47 of the discharge ducts 49 and 49, and is discharged via the cooling air discharge ports 49a and 49a.

The plurality of battery modules 42 are disposed on an upper face of the battery tray 38 in a total of three rows, that is, a middle row in the vehicle width direction and opposite side rows in the vehicle width direction. The middle row in the vehicle width direction projects further forward than the opposite side rows in the vehicle width direction by a portion corresponding to two of the battery modules 42 and 42. Formed on the battery tray 38 is a projecting portion 38a supporting the two battery modules 42 and 42, a pair of high voltage connectors 54 and 54 being provided in a recess portion 38b formed on the left-hand side to the rear of the projecting portion 38a. The high voltage connectors 54 and 54 are disposed beneath a footrest portion 26a of the floor panel 26 in front of the left-hand front seat 29 (see FIG. 4).

Two high voltage internal cables 55 and 55 extending from the high voltage connectors 54 and 54 are connected to a junction board 28 provided in a rear part of the battery pack 31 via a main switch 56 provided in a front part of the battery pack 31. The two internal cables 55 and 55 and other internal cables 57 connecting each of the battery modules 42 to the junction board 28 are disposed at a high position along upper faces of the battery modules 42, and this makes it possible to prevent the battery modules 42 from becoming wet if water enters the interior of the battery case 24. The two internal cables 57 and 57 bend downwardly from the extremity of the battery modules 42 on the left-hand row and are then connected to the high voltage connectors 54 and 54.

Figure 4:
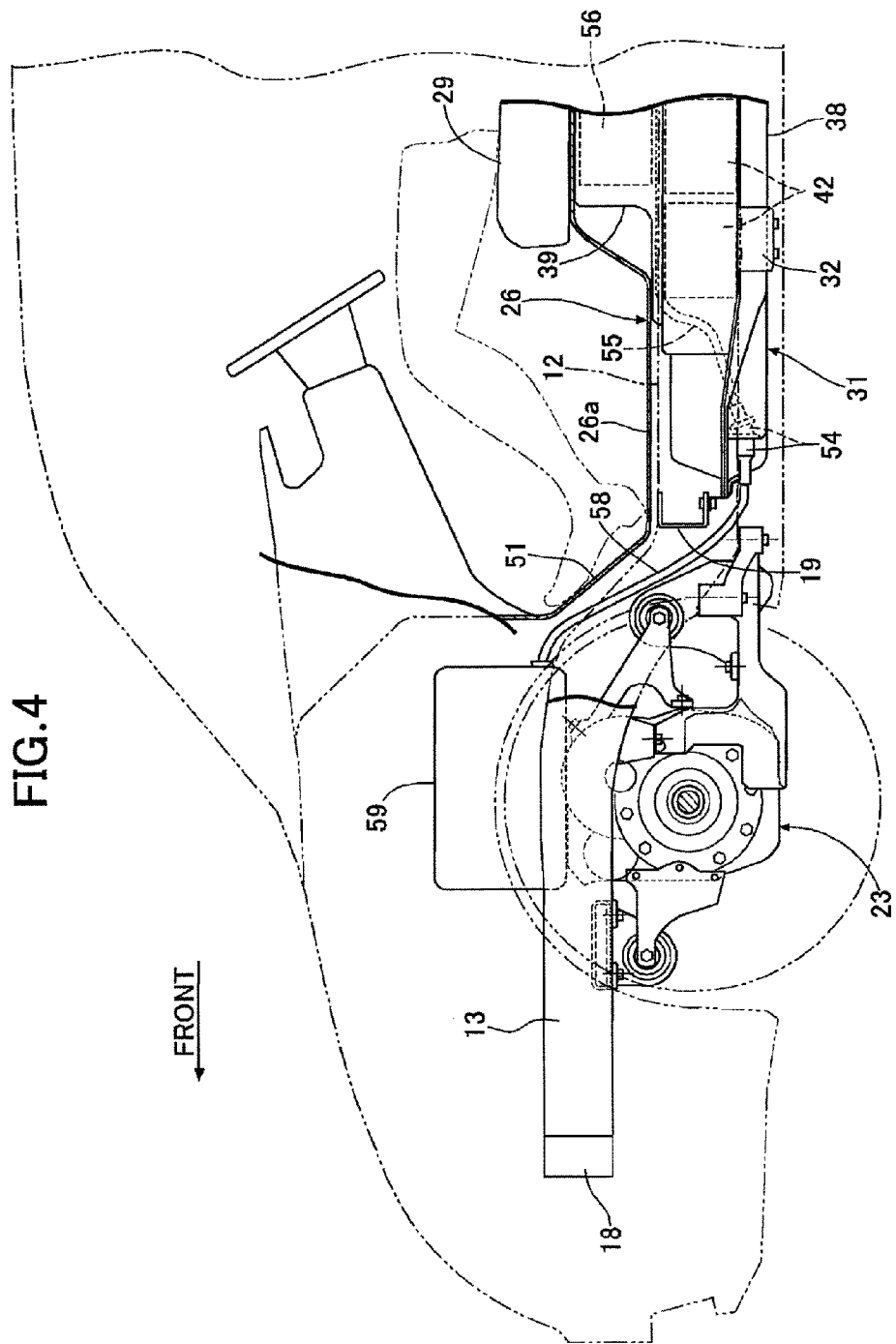
FIG. 4 is an enlarged view of an essential part in FIG. 1. (first embodiment)

As shown in FIG. 4, external cables 58 and 58 extending forwardly from the high voltage connectors 54 and 54 along a lower face of the floor panel 26 bend upwardly along a lower face of a dashboard lower panel 51 and are connected to a power control unit 59 disposed in an upper part of the motor/generator 23. The power control unit 59, which is disposed at a position that is higher than the upper end of the battery case 24, converts high voltage direct current supplied from the battery pack 31 into three-phase alternating current and drives the motor/generator 23 or charges the battery modules 42 with power generated by the motor/generator 23 being regeneratively braked.

As shown in FIG. 2 and FIG. 3, a recess portion 38c is formed on the right-hand side to the rear of the projecting portion 38a of the battery tray 38, and a pair of low voltage connectors 61 and 61 are provided on the recess portion 38c. Low voltage cables 63 extending from the low voltage connectors 61 and 61 supply a control signal to the junction board 28, etc.

The operation of the embodiment of the present invention having the above arrangement is now explained.

Since the battery modules 42 housed within the battery case 24 of the battery pack 31 generate heat due to charging/discharging, they are cooled with cooling air supplied to the interior of the battery tray 38 by means of the cooling device 46. That is, when the cooling fans 47 and 47 are driven, air between the upper face of the battery case 24 and the lower face of the floor panel 26 is sucked in as cooling air via the cooling air suction port 48a of the suction duct 48 and supplied to the interior of the battery tray 38 through the interior of the suction duct 48.

Cooling air supplied to the cooling passage in the interior of the battery tray 38 carries out heat exchange between the upper face of the battery tray 38 and the bottom faces of the battery modules 42, thus cooling the battery modules 42. Cooling air that has flowed from the cooling passage into the discharge ducts 49 and 49 passes through the cooling fans 47 and 47, and is discharged via the cooling air discharge ports 49a and 49a.

When the battery pack 31 is disposed beneath the floor panel 26, for example, when water splashed up by a wheel from the road surface becomes attached to the battery pack 31 and water enters the interior of the battery case 24, there would be a possibility that the high voltage internal cables 55 and 57 disposed in the interior of the battery case 24 would become wet, but in accordance with the present embodiment, the internal cables 55 and 57 are disposed above the battery modules 42, and it is thus possible to reliably prevent them from becoming wet.

Furthermore, if the internal cables 55 and 57 disposed above the battery modules 42 were connected to the external cables 58 and 58 via the high voltage connectors 54 and 54 without changing the height, the height of the floor panel 26 would become high in order to avoid interference with the high voltage connectors 54 and 54 or the external cables 58 and 58 and would constrain the vehicle compartment space, but disposing the high voltage connectors 54 and 54 at a position that is lower than the upper ends of the battery modules 42 enables the external cables 58 and 58 to be disposed at a low position and the height of the floor panel 26 to be lowered, thereby ensuring a sufficient vehicle compartment space.

Moreover, the high voltage connectors 54 and 54 are disposed beneath the footrest portion 26a of an occupant seated on the front seat 29, and due to the high voltage connectors 54 and 54 being disposed at a position that is lower than the upper ends of the battery modules 42 it is possible to ensure a wide space for the footrest portion 26a for the occupant, thus enhancing the comfort.

Furthermore, the external cables 58 and 58 extending from the high voltage connectors 54 and 54 bend upwardly and are connected to the power control unit 59 of the motor/generator 23; if the position of the high voltage connectors 54 and 54 were high, the external cables 58 and 58 would bend downwardly first and then bend upwardly in order to pass through beneath the front cross member 19 (see FIG. 4), the bending curvature of the external cables 58 and 58 would increase, and it would be difficult to assemble them to the vehicle body. However, in accordance with the present embodiment, the high voltage connectors 54 and 54 are disposed at a position that is lower than the upper ends of the battery modules 42, and it is thus possible to reduce the bending curvature of the external cables 58 and 58, thereby making assembly easy.

In this arrangement, the high voltage connectors 54 and 54 are provided, among the rows of battery modules 42, at the front end of the row on one end side in the vehicle width direction (on the left-hand side in the vehicle width direction), and it is thus possible to suppress any increase in the length in the fore-and-aft direction of the battery pack 31 compared with a case in which they are provided at the front end of the row on the middle side in the vehicle width direction. Furthermore, due to the high voltage connectors 54 and 54 being disposed, among the rows of battery modules 42, to the rear of the front end of the row on the middle side in the vehicle width direction, it is possible to dispose the high voltage connectors 54 and 54 by utilizing effectively a space between the forward end of the row on the middle side in the vehicle width direction and the forward end of the row on one end side in the vehicle width direction. Moreover, since the low voltage connector 61 for supplying a signal to the junction board 28 is disposed, among the rows of battery modules 42, in front of the row on the other end side in the vehicle width direction, it is possible to enhance the space efficiency by providing the high voltage connectors 54 and 54 and the low voltage connector 61 in a divided manner on opposite sides in the vehicle width direction.

Furthermore, among the three rows of battery modules 42 placed on the battery tray 38, the two battery modules 42 and 42 at the front end of the row on the middle side in the vehicle width direction protruding forwardly the most are housed by utilizing the space between the left and right front seats 29 and 29, and it is therefore possible to increase the storage capacity of the battery pack 31 without constraining the capacity of the vehicle compartment. Moreover, the front ends of the rows on opposite sides in the vehicle width direction are further to the rear than the front end of the row on the middle side in the vehicle width direction, and it is thus possible to utilize a space formed therein to ensure the space for the footrest portions 26a and 26a for occupants seated on the front seats 29 and 29.

An embodiment of the present invention is explained above, but the present invention may be modified in a variety of ways as long as the modifications do not depart from the spirit and scope thereof.

For example, in the embodiment the high voltage connectors 54 and 54 are provided on the left-hand side in the front part of the battery pack 31, but they may be provided in the middle part or on the right-hand side.

Furthermore, the control equipment of the present invention is not limited to the junction board 28 of the embodiment.

The invention claimed is:

1. A structure for mounting a battery pack on a vehicle in which a battery case housing a plurality of batteries arranged along a fore-and-aft direction of the vehicle is disposed beneath a floor panel, and power of the plurality of batteries is supplied to a control device of an electric motor by connecting an internal cable disposed within the battery case and an external cable disposed outside the battery case in a cable lead out part provided on the battery case, wherein
the internal cable is disposed above the plurality of batteries so as to be disposed on and extend along upper surfaces of the plurality of batteries while straddling the upper surfaces of the plurality of batteries, and the cable lead out part is disposed beneath the floor panel and at a position that is lower than upper ends of the batteries, and
wherein the internal cable is bent downward at a front end of the batteries to extend toward the cable lead out part.

2. The structure for mounting a battery pack on a vehicle according to claim 1, wherein the cable lead out part is disposed beneath a footrest portion for an occupant sitting on a front seat.

3. The structure for mounting a battery pack on a vehicle according to claim 1, wherein the control device is disposed above the battery case and the external cable extends upwardly from the cable lead out part toward the control device.

4. The structure for mounting a battery pack on a vehicle according to claim 1, wherein the batteries form a plurality of rows in the interior of the battery case, and a front end of a row on a middle side in a vehicle width direction extends further forward than front ends of rows on opposite end sides in the vehicle width direction.

5. The structure for mounting a battery pack on a vehicle according to claim 4, wherein the cable lead out part is disposed, among the plurality of rows of the batteries, in front of a row on one end side in the vehicle width direction.

6. The structure for mounting a battery pack on a vehicle according to claim 5, wherein the cable lead out part is disposed rearward of the front end of the row on the middle side in the vehicle width direction.

7. The structure for mounting a battery pack on a vehicle according to claim 5, wherein a low voltage connector for supplying a signal to control equipment of the battery is provided, among the plurality of rows of the batteries, in front of a row on the other end side in the vehicle width direction.

8. The structure for mounting a battery pack on a vehicle according to claim 2, wherein the batteries form a plurality of rows in the interior of the battery case, and a front end of a row on a middle side in a vehicle width direction extends further forward than front ends of rows on opposite end sides in the vehicle width direction.

9. The structure for mounting a battery pack on a vehicle according to claim 8, wherein the cable lead out part is disposed, among the plurality of rows of the batteries, in front of a row on one end side in the vehicle width direction.

10. The structure for mounting a battery pack on a vehicle according to claim 9, wherein the cable lead out part is disposed rearward of the front end of the row on the middle side in the vehicle width direction.

11. The structure for mounting a battery pack on a vehicle according to claim 9, wherein a low voltage connector for supplying a signal to control equipment of the battery is provided, among the plurality of rows of the batteries, in front of a row on the other end side in the vehicle width direction.

12. The structure for mounting a battery pack on a vehicle according to claim 3, wherein the batteries form a plurality of rows in the interior of the battery case, and a front end of a row on a middle side in a vehicle width direction extends further forward than front ends of rows on opposite end sides in the vehicle width direction.

13. The structure for mounting a battery pack on a vehicle according to claim 12, wherein the cable lead out part is disposed, among the plurality of rows of the batteries, in front of a row on one end side in the vehicle width direction.

14. The structure for mounting a battery pack on a vehicle according to claim 13, wherein the cable lead out part is disposed rearward of the front end of the row on the middle side in the vehicle width direction.

15. The structure for mounting a battery pack on a vehicle according to claim 13, wherein a low voltage connector for supplying a signal to control equipment of the battery is provided, among the plurality of rows of the batteries, in front of a row on the other end side in the vehicle width direction.

16. The structure for mounting a battery pack on a vehicle according to claim 6, wherein a low voltage connector for supplying a signal to control equipment of the battery is provided, among the plurality of rows of the batteries, in front of a row on the other end side in the vehicle width direction.

17. The structure for mounting a battery pack on a vehicle according to claim 2, wherein the control device is disposed above the battery case and the external cable extends upwardly from the cable lead out part toward the control device.

18. The structure for mounting a battery pack on a vehicle according to claim 17, wherein the batteries form a plurality of rows in the interior of the battery case, and a front end of a row on a middle side in a vehicle width direction extends further forward than front ends of rows on opposite end sides in the vehicle width direction.

19. The structure for mounting a battery pack on a vehicle according to claim 18, wherein the cable lead out part is disposed, among the plurality of rows of the batteries, in front of a row on one end side in the vehicle width direction.

20. The structure for mounting a battery pack on a vehicle according to claim 19, wherein the cable lead out part is disposed rearward of the front end of the row on the middle side in the vehicle width direction.

21. The structure for mounting a battery pack on a vehicle according to claim 19, wherein a low voltage connector for supplying a signal to control equipment of the battery is provided, among the plurality of rows of the batteries, in front of a row on the other end side in the vehicle width direction.

22. The structure for mounting a battery pack on a vehicle according to claim 3, wherein floor panel is disposed on a pair of floor frames extending along the fore-and-aft direction of the vehicle and a front cross member connecting front ends of the floor frames, and wherein the external cable extends beneath the front cross member.

* * * * *